United States Patent [19]
Eidelberg et al.

[11] 3,828,117
[45] Aug. 6, 1974

[54] LIQUID-TIGHT SWIVEL COUPLER FOR ELECTRICAL CONDUIT

[76] Inventors: Jonah Eidelberg, 8 Clafford Ln., Huntington Station, N.Y. 11746; Thomas Mooney, 40 W. Cliff Dr., Mount Sinai, N.Y. 11766; John J. Brett, Marion Ave., Glen Ellyn, Ill. 60137

[22] Filed: Jan. 16, 1973

[21] Appl. No.: 324,089

Related U.S. Application Data

[63] Continuation-in-part of Ser. No. 90,496, Nov. 18, 1970, Pat. No. 3,710,911.

[52] U.S. Cl. .................. 174/84 S, 29/437, 285/354
[51] Int. Cl. ........................... H02g 3/06, F16l 19/00
[58] Field of Search ............ 285/354, 55, 110, 382, 285/156, 158, 177; 174/84 S, 83, 65 R, 65 SS, 78

[56] References Cited
UNITED STATES PATENTS

| | | |
|---|---|---|
| 2,131,316 | 9/1938 | Ellis .................................. 285/55 X |
| 2,366,444 | 1/1945 | Dorman .............................. 285/247 |
| 2,447,900 | 8/1948 | Crawley .......................... 285/354 X |
| 2,947,800 | 8/1960 | Badeau et al. ..................... 174/65 R |

Primary Examiner—H. Hampton Hunter
Attorney, Agent, or Firm—Howard C. Miskin

[57] ABSTRACT

A swivel coupler for connecting a pair of rigid electrical conduits especially in a confined space, includes a tubular body member with an inner sleeve of rigid plastic material, which protrudes slightly beyond the ends of the body. A pair of nuts are slidably mounted on the outer peripheral surface of the tubular body between outwardly directed radial flanges adjacent opposite ends of the body and which thread a corresponding conduit. A method of fabricating the coupling is to reverse opposite body ends 180° to abut the outer peripheral surface of the body, have one end with an outside diameter smaller than the inside diameter of the nuts, position the nuts back to back on the body, and then enlarge the reduced end of the body to its normal diameter or larger.

2 Claims, 27 Drawing Figures

PATENTED AUG 6 1974

LIQUID-TIGHT SWIVEL COUPLER FOR ELECTRICAL CONDUIT

This application is a continuation in part of copending application Ser. No. 90,496 filed Nov. 18, 1970 and now U.S. Pat. No. 3,710,911 dated Jan. 16, 1973.

The present invention relates to an electrical coupling or a connector for attachment to electrical conduit and a method of fabricating the same. In particular this invention relates to a coupling used in attaching a pair of conduits in a confined space, where there is substantially no "play" in the conduit, and making a liquid-tight connection with a secure grounded installation, and which allows ready removal or opening of the installation whenever needed, and the method of fabricating such a coupling efficiently.

Heretofore, when conduit, especially rigid conduit, was installed in a confined space, which allowed no "play" in the conduit, i.e., no movement of the conduit, it was difficult to install, or, if necessary for whatever the reason, to reopen the connection and replace a section of conduit or to gain entrance to the conduit. Additionally, in many cases a good liquid-tight seal was necessary, if the coupling connection was made in any location where there was moisture in the air or liquid splashing on the conduit, which could enter the conduit by the smallest opening in the coupling connection, if it was not perfectly liquidtight. As an example of the tortuous path that a liquid could follow in entering a conduit, is the threaded connection between the nut on the coupler and the threads on the conduit. Any moisture condensed and trapped in the conduit enhances corrosion and makes for poor electrical connection and possible shorts. Additionally, a good ground connection between the connected conduits was necessary. Oftentimes in the past, a coupling, which made a good liquid-tight seal made a poor ground connection and vice versa. Heretofore, to provide a good ground and a liquid-tight connection as well as connect conduit in a confined space, normally required a three-part connection which was expensive, increased the cost of installation, and required a separate fitting of some type. Also, stocking of the various parts of these separate fittings became an inventory problem besides the propensity of the separate fittings to become separated.

Therefore, it is a principal object of the present invention to provide a method or fabricating a coupling for electrical conduits for extremely tight space installations which is simple to set up, accurate in assembly, and which provides an automatic repetitive operation.

A further object of the present invention is to provide an automatic method of fabricating a coupling for electrical conduits which can be attached to and can clamp the conduits by various means.

A still further object of the present invention is to provide a coupling for electrical conduits, which could be of different diameters, and which is simple and efficient to fabricate allows no separation of parts to avoid any loss of parts in the field, and is inexpensive to produce.

Still another object of the present invention is to provide a positive method of fabricating a liquid-tight swivel coupling for electrical conduit which does not require rotation of either the conduit or coupling body, and which is simple to use and install and remove and reinstall as needed.

Further objects and advantages will become apparent from the following description taken in connection with the accompanying drawing wherein:

FIGS. 12 through 16 illustrate a sequence a steps showing another method of fabricating a coupling in accordance with the present invention;

FIGS. 17 through 19 illustrates a sequence of steps showing still another method of fabricating a coupling in accordance with the present invention.

Figures 1, 2, 3:
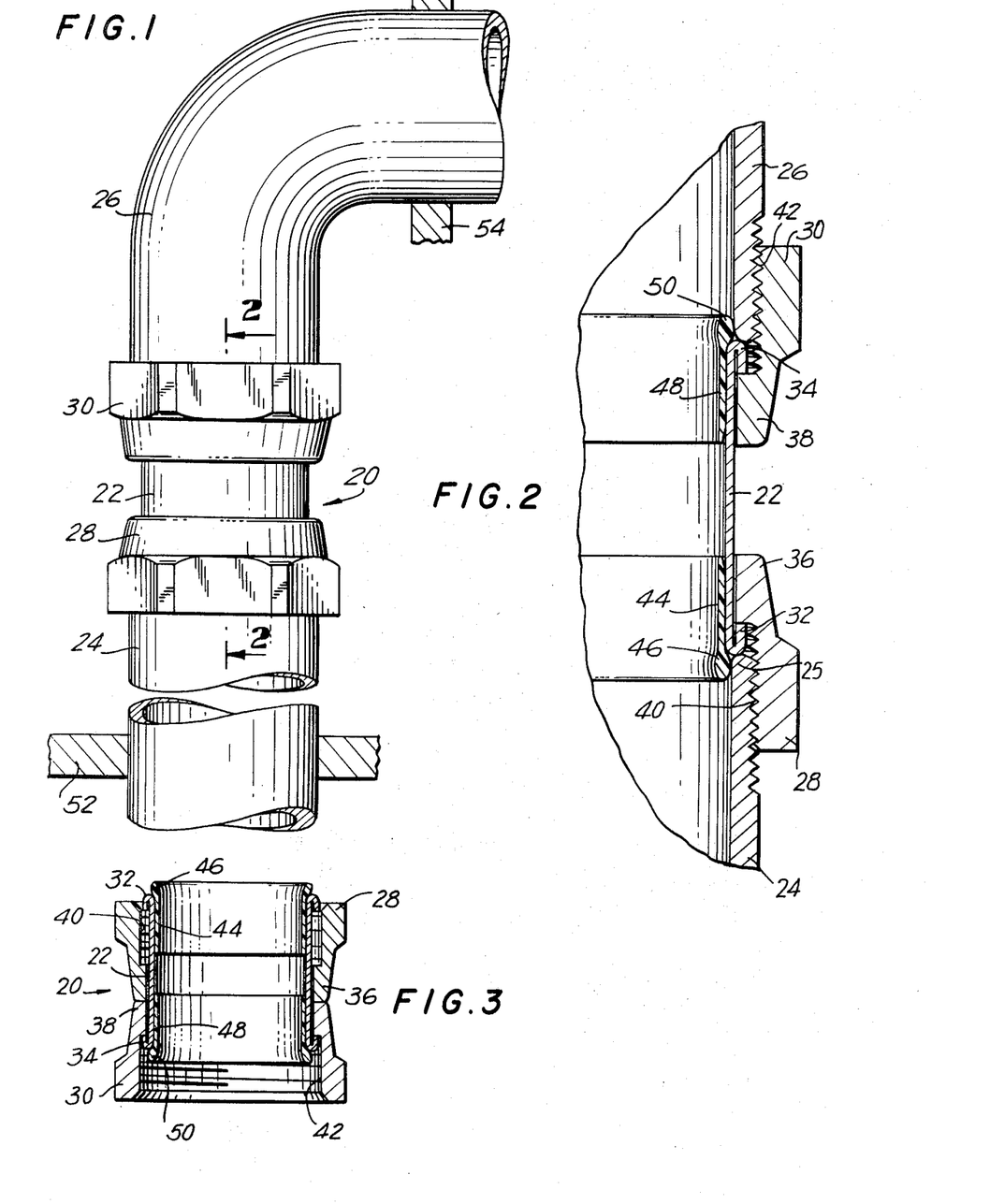
FIG. 1 is a general perspective view of a coupling made in accordance with the present invention connecting a pair of rigid conduits.
FIG. 2 is an enlarged cross-sectional view taken along line 2—2 of FIG. 1.
FIG. 3 is an elevational cross-sectional view of the coupling shown in FIG. 2.

In the form of the invention shown in FIGS. 1 through 3, an electrical coupling 20 incorporating the invention has a hollow tubular body 22 for connecting a pair of conduits 24 and 26 at opposie open ends. Body 22 has a through bore between its ends. Rotatably and slidably mounted about the outer peripheral surface of body 22 are a pair of nuts 28 and 30 back to back and their open ends facing towards corresponding ends of body 22. As seen best in FIGS. 2 and 3 the opposite ends of body 22 are rolled over exteriorly and juxtapositioned to the outer peripheral surface of body 22 to form flanges 32 and 34, respectively. Flanges 32 and 34 cooperatively engage corresponding inwardly directed nut flanges 36 and 38, respectively. As seen best in FIG. 3, nuts 36 and 38 are back to back on body 22. Nuts 28 and 30 have internal peripheral surfaces threaded, as indicated at 40 and 42, respectively, to mate with corresponding threads about the outer surface of conduits 24 and 26, respectively. Nuts 28 and 30 are freely rotatable and slidable on body 22 between flanges 32 and 34. It is important that body 22 have sufficient distance between flanges 32 and 34 so that when nuts 28 and 30 abut at one end of body 22, the end of the other nut does not project beyond the other end of body 22. This allows the full unthreading of at least one of the nuts with no part of the nut extending beyond the body end.

Tightly abutting the inner peripheral surface adjacent one end of body 22 is a resilient sleeve 44. Advantageously, sleeve 44 is force fitted into body 22 and retained by friction. Sleeve 44 has a radially outwardly directed portion 46, which is advantageously thicker than the remaining skirt portion, which is positioned within the bore of body 22. A portion of thick end 46 of sleeve 44 extends slightly beyond the edge of body 22. In a similar manner, a second resilient sleeve 48 is fitted into the opposite end of body 22 and similarly has a thick end 50 which extends slightly beyond the other edge of body 22. The facing ends of sleeves 44 and 48 are preferrably spaced apart, but could be closer if longer sleeves are used.

In use body 22 is shown mounted between facing ends of rigid conduits 24 and 26, which as shown have threaded ends for mating with its corresponding nut on coupling 20. Nut 28 is threaded on the mating threaded portion of conduit 24. Nut 28 is tightened forcing conduit end 25 of conduit 24 toward the facing end of body 22. As seen best in FIG. 2, conduit end 25 engages the projecting end 46 of sleeve 44, and as nut 28 is further tightened, conduit end 25 deforms and flexes sleeve end 46 until conduit end 25 engages the facing end of body 22 making a metal-to-metal contact. The deforming and flexing of portion 46 of sleeve 44 urges sleeve 44 tightly against conduit end 25 and forms a tight seal about conduit 24, regardless of any surface irregularities or dirt or slight misalignment.

In a similar manner, conduit 26 is positioned abutting the opposite end of body 22 and nut 30 is threaded about the mating threaded surface of conduit 26 forcing conduit end 27 into engagement with thickened resilient sleeve end 50 of sleeve 48, until conduit end 27 abuts the facing end of body 22, making a metal-to-metal contact as well as deforming sleeve end 50 to make a further tight seal about conduit end 27.

As is evident from FIGS. 1 and 2, conduits 24 and 26 being coupled can just fit the available space with no rotation of the conduit necessary. The conduits are illustrated as being immovable and passing through walls 52 and 54, respectively. As shown, conduit 26 is a 90° elbow which can not be rotated, to thread it on a coupling since wall 54 prevents rotation. With this type of installation, only a three-part coupling could have been used. Coupling 20 allows easy assembly, and if necessary, disassembly with the sole threading rotation being nuts mounted on the body of the coupling. Since neither the body of the coupling nor conduits need be rotated during installation, the seal is made solely by relative axial movement of the conduit and coupling body, thereby lessening the likelihood of scoring or cutting the sealing member. Even with the facing ends of the clamped conduits 24 and 26 being in close abutting relation with body 22, and the conduits being fixed during installation with the present invention, it is a relatively simple matter to remove the coupling if need arises without disturbing the conduit. To accomplish this, the space between flanges 32 and 34 on body 22 must be sufficient so that when the flanges of nuts 28 and 30 abut, the nuts are entirely intermediate of the ends of body 22, so that body 22 can be forced between the facing ends of conduits 24 and 26, if necessary.

As is evident, in use there is no need to bend or deform the conduit to assemble even in tight areas.

Figure 4:
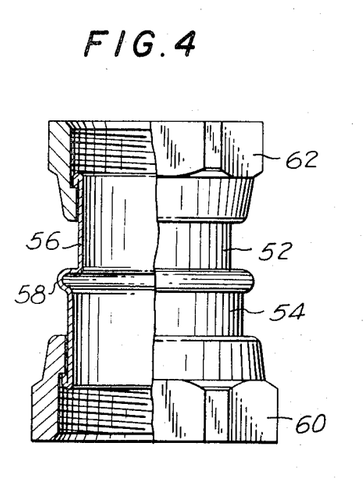
FIG. 4 is an elevational view, partially in section, of another form of the coupling for connecting different size conduits.

An embodiment that couples two different diameter conduits is illustrated in FIG. 4, where a hollow body member 52 has a larger inner diameter at one end, indicated at 54 and a smaller inner diameter at the other end, indicated at 56. As shown portions 54 and 56 are interconnected by a center portion 58 where the change in diameter occurs. Center portion 58 has an outwardly directed rib which restricts the movement of nuts 60 and 62. The opposite ends of body member 52 are reversely turned, to form flanges which maintain nuts 60 and 62 in position for threadedly mating with corrsponding conduit, not shown. While not shown, an interior resilient sleeve could be disposed within the bore of member 52 at each end portion 54, 56 in the manner discussed above.

In the embodiment of the coupling shown in FIG. 4 two different sized conduits are easily coupled in the manner discussed above.

Figure 5:
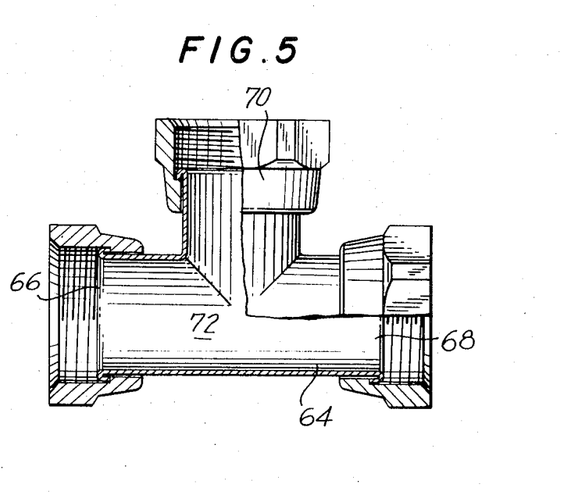
FIG. 5 is an elevational view, partially in section, of another form of the coupling connecting a plurality of conduits.

A still further embodiment is sillistrated in FIG. 5 where a hollow body 64 is illustrated having three openings 66, 68 and 70 communicating with the internal bore 72. While openings 66 and 68 are shown axially aligned and opening 70 being transverse thereto, opening 70 could be positioned at any angle to the axis of body 64 and similarly opening 68 could be positioned at an angle to opening 66. With the construction of the coupling illustrated in FIG. 5, connections to various conduits, aligned at various angles with each other can easily be made since neither the coupling nor the conduits are rotated, but only the rotatable nut mounted on the body.

While the flexible sleeves are not shown positioned within the bore 72 they could if desired.

In use, the coupling illustrated in FIG. 5 is assembled on various conduits in a manner described above with respect to the embodiments shown in FIG. 1 through 3. Also, while openings 66, 68 and 70 are shown being all substantially equal in diameter, they could vary in diameter in a manner similar to that shown in FIG. 4 to couple various sized conduits. Also, more than three openings can be accommodated in the body.

Figure 6:
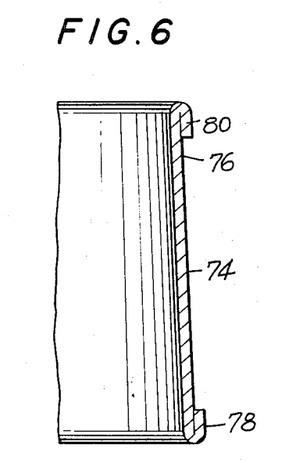
FIG. 6 is an elevational cross-sectional view of a body partly formed.
Figure 7:
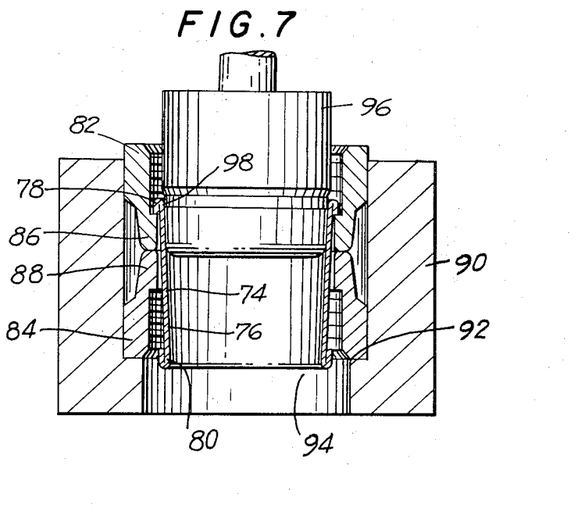
FIG. 7 is a vertical section through a set of dies, which may be used in a power press, showing the operation thereof for carrying out a step in one method of fabricating the coupling.

In carrying out the improved method of making and assembling a coupling in accordance with the present invention, reference is made to FIGS. 6 and 7 where a hollow tubular body member 74 has a passageway therethrough, and is provided preferrably of a suitable ductile material, for example a steel, which may or may not be heat-treatable or hardenable. The opposite ends of body member 74 are rolled over to form flanges and against which the nut flanges rest. One of these ends has a larger outer diameter than the other end, which could be accomplished in many ways, well known in the art, so as to allow positioning of the nuts on the body. Then the reduced or smaller end is expended to its finished size, thereby permanently positioning the nuts on the tubular body. A rigid plastic sleeve may then be inserted into the interior passageway of the tubular member 74.

The tubular member 74 illustrated in FIG. 6 can be formed in a variety of ways well known in the art. The ends of the tube, including one end 76 reduced in diameter can be fabricated using well known techniques in the art, such as a sequential forming operation and then a squeezing operation.

Body member 74 has bent over ends to form flanges 78 and 80 at opposite ends. Reduced end 76 is smaller in diameter then the inner diameter of the nuts to be mounted about the outer peripheral surface of the body member 74, and the end opposite end 76 provides an interference fit with the mating flange of the nuts. As illustrated best in FIG. 7, nuts 82 and 84 are slid onto body member 74 over the reduced end 76 and positioned in back-to-back relation. Reduced end 76 has an outer diameter just sufficient to allow nut flanges 86 and 88 to pass. Nut flanges 86 and 88 abut.

Once nuts 82 and 84 are positioned on body member 74, it is advantageously expanded in a die assembly illustrated in FIG. 7. The die assembly is adapted for mounting in a suitable power press (not shown) for operation thereby and comprises a bottom die member 90 having an inner flange or a step 92. Die member 90 has a bore 94 which has an inner diameter substantially equal to slidably receive the outer diameter of nuts 82 and 84. The lowermost edge of the bottom nut illustrated as 84 rests on step 92. Axially movable within bore 94 is a reciprocating punch or finger 96 having a reduced diameter end portion 98. The outer diameter of punch 96 is substantially the same as the desired finished inner diameter of member 74. Punch 96 slidably fits within the bore of the larger diameter end of tubular member 74 and is larger than the inner diameter of reduced end portion 76. As illustrated in FIG. 7, the lower end of member 74 is the reduced portion 76. Nuts 82 and 84 are positioned within bore 94 of die 90 as shown with flanges 86 and 88 abutting. Member 74 is slid into bore 94 with reduced end 76 downwardly extending and body flange 78 rests on uppermost nut flange 86. Punch 96 extends into bore 94 and then into the bore of member 74. Smaller punch end 98 is centered within the bore of member 74 and then continues its movement into bore 94 and exposed sleeve 74 outwardly to complete the expanding operation of the reduced end 76 of the body member 74. The movement of punch 96 forces the reduced end 98 and the remainder of punch 96 through the opening of member 74 and is carried far enough through bore 94 to pass punch 96 through reduced portion 76 of member 74 so as to expand member 74 to its finished diameter, so that body flange 80 interferes with nut flange 88. After this expanding operation is completed the tube and nuts are removed from punch 96 and the coupling is almost ready to be used.

The next step is the insertion of resilient sleeves 44 and 48 into the bore of tubular member 74 from opposite ends if so desired. Because of the resiliency of sleeves 44 and 48 these are press-fitted into the ends.

The completed coupling is illustrated in FIG. 3 and in use in FIG. 2.

If desired, one body flange could be formed at a time to allow placement of the nuts before the second end is turned or the nuts placed on the body before the ends are turned.

Figure 8:
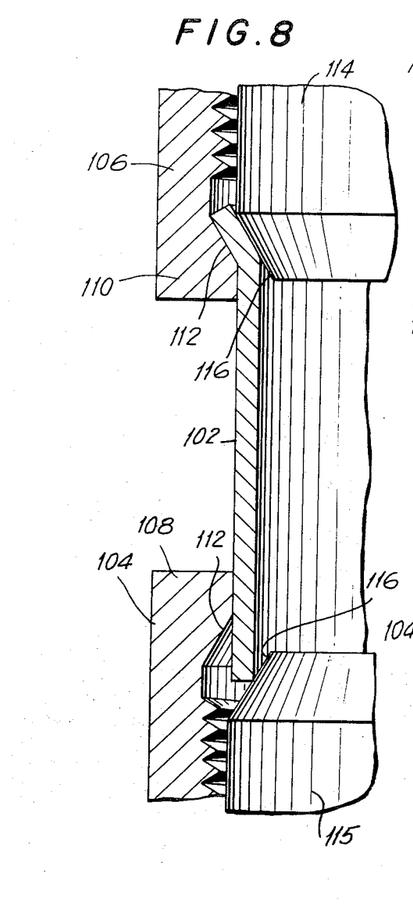
FIG. 8 is an enlarged fragmentary elevational view of a step in the fabrication of a further embodiment illustrating the botton die preparatory to perform the expanding operation, and the upper die after the expanding operation has occurred.
Figures 9, 10:
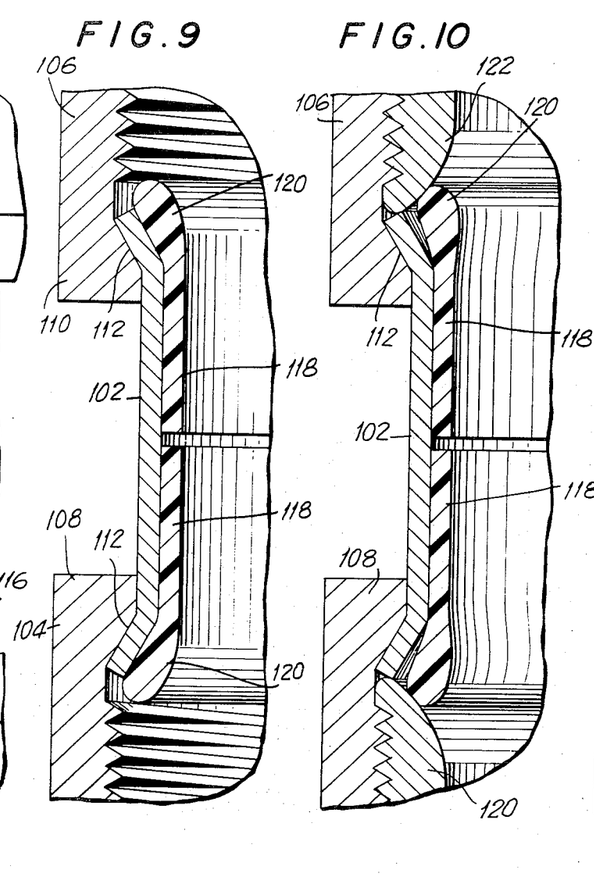
FIG. 9 is a view like FIG. 8 and shows a fragmentary cross-sectional elevational view of a completed further embodiment of a coupling.
FIG. 10 is a fragmentary elevational view showing the coupling of FIG. 9 in operative position.

A further embodiment is illustrated in FIG. 8, which illustrates a uniform diameter tube 102 supported in a die assembly having nuts 104 and 106 positioned and held adjacent opposite ends. Nuts 104 and 106 have flanges 108 and 110, respectively, with tapered surfaces 112. Moving into the bore of tube 102 from opposite ends are plungers 114 and 115, each having tapered ends 116. As shown, plunger 115 is just beginning to move into the bore of tube 102. Continued relative movement of plunger 114 forces the ends of tube 102 against tapered surface 112 of the nut flange 110, which is illustrated with respect to plunger 114, and is flush against tapered surface 112 of nut flange 110. The outward flared opposite ends of tube 102 hold nuts 104 and 106 in position, which is illustrated in FIG. 10. Resilient sleeves 118 are positioned within the interior of the bore of tube 102. Sleeves 118 have thickened ends 120 which project slightly beyond the flared ends of tube 102, which is shown in FIG. 10.

Figure 11:
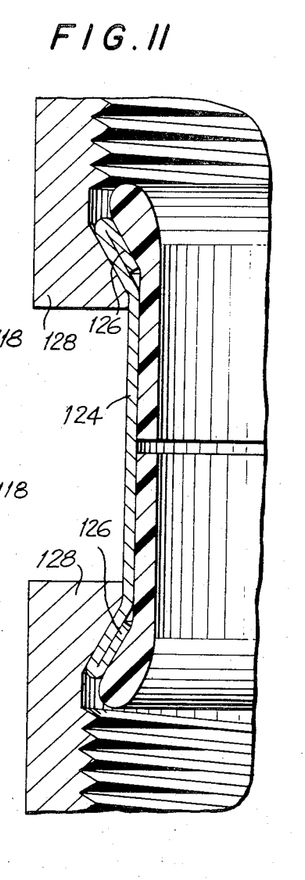
FIG. 11 is a fragmentary elevational cross-sectional view showing a still further embodiment of the present invention.
Figure 12:
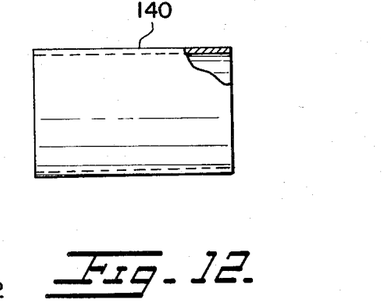

In use, nuts 104 and 106 are tightened on mating threaded ends of conduits 122 until ends 122 deflect thickened ends 120 of sleeves 118, and until conduit ends 122 engage their corresponding flared ends of tube 102, which is illustrated in FIG. 11. This makes a liquid-tight seal, as discussed above with respect to FIG. 2.

A still further embodiment is illustrated in FIG. 11, in which the ends of tube 124 are bent over interiorly, as illustrated at 126. Nuts 128 are mounted on tube 124 in the manner discussed above, and the ends flared outwardly. In a similar manner resilient sleeves 130 are positioned interiorly of tube 124.

Figure 13:
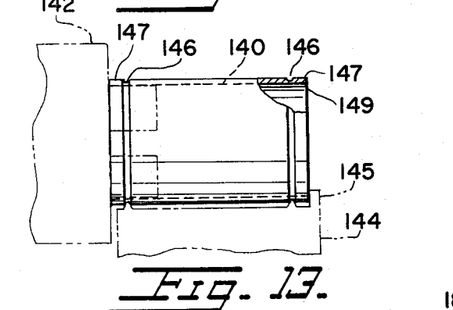
Figure 14:
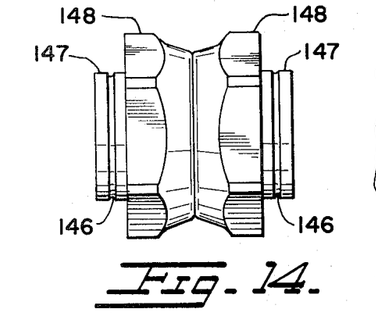

A further embodiment of the method for fabricating the coupling is illustrated in FIGS. 12 through 16. A section of tubing 140 is advantageously cut from a length of tubing to a predetermined length. Tubing section or tubular member 140 is preferably thin walled with a bore passing therethrough and is mounted on one end on an inside chuck illustrated at 142 and tube section 140 is rotated. A groove forming tool, illustrated at 144, engages the outer peripheral surface of section or member 140 forming annular notches or grooves 146, adjacent opposite ends and spaced a predetermined distance from each end. Advantageously groove forming tool 144 forms the notches or grooves 146 simultaneously on tubular member 140 as illustrated in FIG. 13.

During the notching and facing operation shown in FIG. 13, the inner edge of member 140 is chamfered to form a bevel illustrated at 149, such as by means of a finger 145 mounted on the grooving tool 144. In a similar manner the opposite inner edge of member 140 can also be chamfered during the rotating operation. The chamfering could be done in a separate step if so desired.

Figures 15, 19:
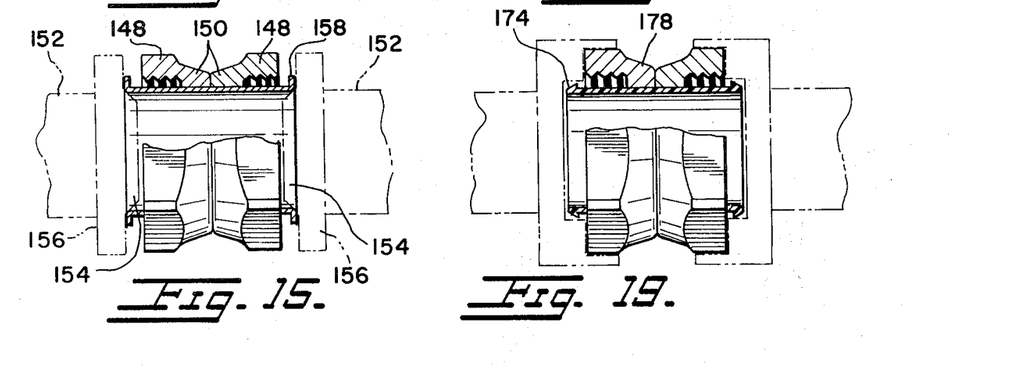

Groove forming tool 144 is backed off after forming grooves 146, and a pair of nuts 148 having flanges 150, as seen in FIG. 15, are slidably mounted onto the outer surface of tubular member 140 with the flange ends of the nuts abutting.

Figure 16:
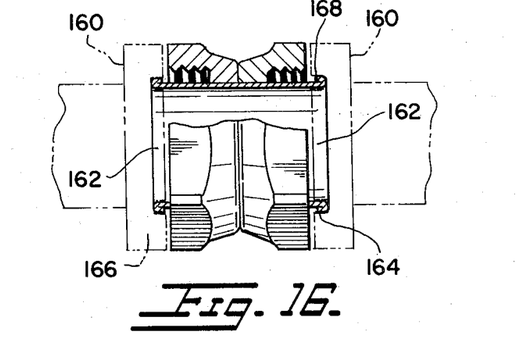

After nuts 148 are positioned on member 140 in the manner shown in FIG. 15, the opposite ends of member 140, indicated at 147, are formed into flanges, as illustrated in FIG. 15. Moving into the bore of tubular member 140 as shown in FIG. 15 from opposite ends, are plungers 152 each having a tapered center finger 154 and an extending flange 156 at right angles to the direction of movement and the axis of finger 154. The tapered surface of fingers 154 extend outwardly to a diameter equal to the inner diameter of the bore of tubular member 140. As shown in FIG. 15, as plungers 152 move towards each other, their respective fingers 154 enter the bores, and continued relative movement of plungers 152 towards each other forces the ends 147 of member 140 outwardly against the tapered surfaces of fingers 154 so as to bend about their corresponding groove 146. Upon engagement of ends 147 with the under surface of a corresponding flange 156, they form an outwardly extending right angle flange 158. Plungers 152 are withdrawn and a pair of wiping or forming tools 160 move towards each other from opposite ends of member 140 as illustrated in FIG. 16. Each tool 160 has a centering finger 162 which is slidably received in opposite ends of the bore of member 140. The under surface of tool 160 has an annular recess in its under surface between finger 162 and an outer section 166. Each recess 164 is aligned with a corresponding flange 158 formed on the ends of member 140 and each is of a width slightly more than twice the maximum thickness of the material of tubular member 140. The inner edges of recess 164 are rounded so that continued inward relative movement of tools 160 force flange 158 to roll over exteriorly and be juxtapositioned to the outer peripheral surface to form the finished flange 168 as illustrated in FIG. 16. Tool 160 is removed and nuts 148 are freely rotatable and slidably positioned on the outer body of member 140 and are maintained in position by reason of the flange 168.

If desired, member 140 could be plated to provide the intended result, such as improved conductivity, corrosion resistance or the like. The plating operation, such as by flash plating, should be done prior to the wiping operation illustrated in FIG. 16. In other words, according to the Underwriters Laboratory requirements the flash plating step should take place between steps shown in FIGS. 15 and 16. In a manner similar to that described above with the previous embodiments of resilient sleeves could be positioned interiorly of tubular member 140.

Figure 17:
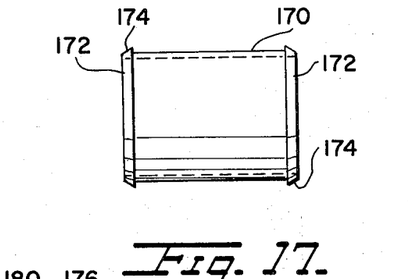

Another embodiment in fabricating the coupling is illustrated in FIGS. 17 through 19. As seen in FIG. 17, a tubular body member 170 has outwardly extending flanges 172 at opposite ends, with their outer edges bevelled as illustrated at 174 to form a tapered surface. Tubular member 170 can be molded of any rigid, or strong, resilient plastic such as nylon, polypropylene, Teflon, or the like, or extruded and then formed in a post extruding operation, as is well known in the art. Further, member 170 could be made from a highly resilient metal and machined to the desired configuration.

Disposed at each end of member 170, as seen best in FIG. 18 are nuts 176 with the flange end 178 adjacent and facing a corresponding flange 174 of member 170. Each nut 176 is received in a plunger 180 which move toward each other, forcing nuts 176 to be sprung over flange 174 as shown in FIG. 19. Flange 170 having a right angle surface facing the corresponding right angle surface of nut flange 178, hold nuts 176 in position on member 170.

Another embodiment for fabricating a coupling in accordance with the present invention is illustrated in the steps shown in FIGS. 20 through 27. Reference is made to the description given above with respect to FIGS. 12 through 16 which discloses a generally similar series of steps.

Figure 20:
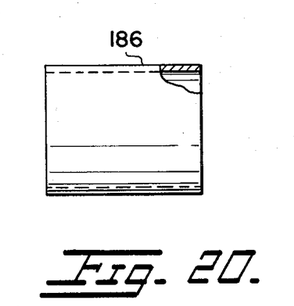
FIGS. 20 through and including FIG. 27 illustrate a sequence of steps showing a further method of fabricating a coupling in accordance with the present invention.
Figure 21:
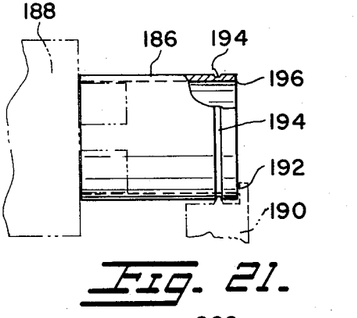

FIG. 20 illustrates a tubular section or member 186 which is sized to length preferably from longer strip of tubular material. One end of member 186 is mounted on a chuck and rotated and a groove forming tool 190 forms a groove 194 therein spaced from the end of tubular member 186. The end of tubular member 186 is chamfered at 196 during this operation. One end of member 186 is positioned against a surface or stop 198 and a flange forming tool 200 is moved toward the notched end. Tool 200 has an inner centering finger 202 which has a tapered portion 204 which is tapered outwardly abutting a flange 206. The tapered portion 204 proximate flange 206 has a slightly larger diameter than the inner diameter of member 186. Continued movement of tool 200 and the cooperative engagement of chamfered edge 196 of member 186 and the tapered portion of finger 202 force the end of member 186 about groove 194 to form a flange 208 which is at right angles to the axis of member 186. Tool 200 is removed and a wiping tool 210 which has an inner finger 212 which is essentially equal to the bore of member 186 and further has a recess 214 in its lower face. Recess 214 is aligned with flange 208. Continued movement of tool 210 inwardly towards member 186 forces flange 208 to engage the inner surface of recess 214 and to roll over exteriorly and be juxtaposed to outer peripheral surface of member 186 to form the finished flange 216. Recess 214 is slightly larger than twice the thickness of flange 208. Member 186 is removed and the flanged end 216 is positioned on an inside chuck 188 and a groove 218 is formed by the groove forming tool 190 and the inner edge is chamfered at 220 similar to that described with respect to FIG. 21. A pair of nuts 222 is mounted on member 186 and illustrated in FIG. 26, so that the flange of the nut closest to the flanged end 216 of member 186 abuts said flange 216. The end of member 186 adjacent a groove 218 is bent into right angle and rolled over in a manner similar to that disclosed and described with respect to FIG. 22 and 23 above, to form a flange 214a from the intermediate right angle flange 208a. Nuts 222 are contained on body 186 in a manner discussed above. In a manner similar to that described above in the earlier embodiments a resilient plastic sleeve can be position interiorly of member 186.

Figure 22:
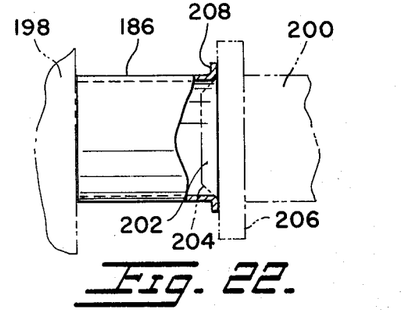
Figure 23:
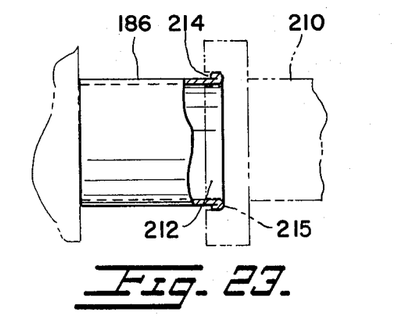
Figure 24:
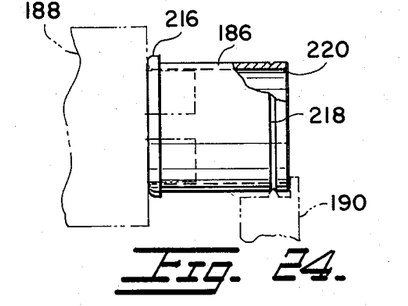
Figure 25:
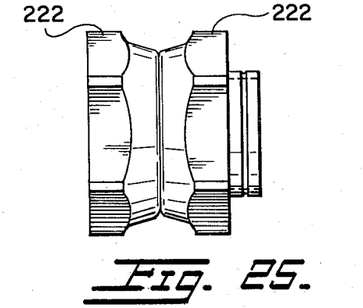
Figure 26:
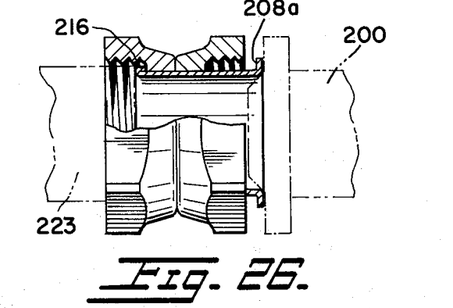
Figure 27:
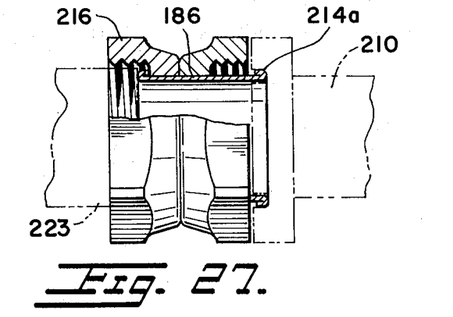

If desired the steps illustrated in FIGS. 22 and 23 and correspondingly in FIGS. 26 and 27 can be made consecutively with the use of a combination tool with one stroke of the press. Also if desired, the tubular member can be plated to provide the finish desired which preferably should be done prior to the wiping operations. Advantageously, the grooves formed in FIGS. 13, 21 and 24 have a full radius to provide for certainty in bending in the initial flanging operation.

Also while a pair of resilient sleeves were shown positioned within the bore of tube 124, a single unit may be used. The flexibility of the sleeve allows the insertion of the unitary sleeve. While the use of flexible sleeve interiorly of the coupling member provides a fluid-tight seal with the conduit and coupling body and is essential where the cupling is being used in a hazardous location, such as inflammable or explosive atmospheres, making a fluid-tight coupling is not essential in some instances. The resilient sleeves do not have to be used, and metal-to-metal contact is made between the coupling body and the conduit, forming a liquid tight seal, especially in the smaller trade sizes. Further, the seal is maintained even when a pressurized fluid is used within the conduit, such as carbon dioxide or even air.

Resilient sleeves shown are preferably molded in the desired configuration or can be extruded in place by applying a selected force. Advantageously, sleeves 30 and 34 are made of a resilient plastic, such as nylon, polypropylene, "Teflon," or elastomers, or the like, or ductile metals, such as lead or soft copper can be used.

The intermediate portions of the tubular body may be expandable, such as by bellow construction, or flexible or bendable, as needed.

It will be seen from the above that in all forms of the coupling, the nuts are positioned during the fabrication. Even if the conduit end does not abut the metal body of the tubular sleeve member, a liquid-tight seal is formed and the ground can be made via the nuts used. In the present invention, both a metal-to-metal contact and the plastic-to-metal seal can be made.

The deforming of the thicker section of the resilient sleeve during assembly provides a slight bending or flexing about the thinner section of the sleeve, which more securely holds the sleeve in the body bore and makes a fluid-tight seal in the interior of the bore of the body member.

While preferred embodiments of this invention have been specifically disclosed, it is understood that this invention is not limited thereto, since many variations will be readily apparent to one skilled in the art, and the invention is to be limited only by the terms of the following claims.

What is claimed is:

1. A coupling for attachment to a pair of spaced tubular conduits having end walls comprising: a rigid tubular body having flanges at opposite ends and a bore passing therethrough, said ends being generally axially aligned with said conduit walls and adapted to engage the conduit end walls when assembled thereto to provide metal-to-metal contact and an electrical ground and a pair of nuts in back-to-back relation slidably and rotatably mounted about the outer surface of said body haVing an interiorly directed flange which cooperates with said body flanGe to prevent displacement of the body and to position said nut during assembly, said body flanges being spaced apart a distance at least equal to the length of one of said nuts and the thickness of the flange on the other of said nuts.

2. A coupling as in claim 1 further including a resilient sleeve telescoping each end of said tubular body and in moisture tight engagement therewith, said sleeve including a portion proejcting beyond the ends of said body and having an outwardly bulging outer peripheral end border whose maximum diameter is greater than the inside diameter of said conduit and whose end is rounded and in relaxed state has a diameter greater than the inside diameter of said conduits, said end border adapted to engage the inside bore of a corresponding conduit.

* * * * *